US006457350B1

(12) United States Patent
Mitchell

(10) Patent No.: US 6,457,350 B1
(45) Date of Patent: Oct. 1, 2002

(54) CARBON NANOTUBE PROBE TIP GROWN ON A SMALL PROBE

(75) Inventor: Thomas Owen Mitchell, Redwood City, CA (US)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 09/657,428

(22) Filed: Sep. 8, 2000

(51) Int. Cl.$^7$ .............................. G02B 5/28; B44C 1/22
(52) U.S. Cl. ........................................ 73/105; 216/11
(58) Field of Search ......................... 73/105; 250/306, 250/307; 216/11

(56) References Cited

U.S. PATENT DOCUMENTS

| | | | |
|---|---|---|---|
| 5,307,693 A | 5/1994 | Griffith et al. ............ 73/862.68 |
| 5,703,979 A | 12/1997 | Filas et al. ..................... 385/43 |
| 5,756,887 A | 5/1998 | Bryson, III et al. ........... 73/105 |
| 5,824,470 A | * 10/1998 | Baldeschwieler et al. ....... 435/6 |
| 6,159,742 A | * 12/2000 | Lieber et al. ................ 436/164 |
| 6,346,189 B1 | * 2/2002 | Dai et al. .................... 205/766 |

FOREIGN PATENT DOCUMENTS

| WO | WO-98/05920 | * | 2/1998 |
| WO | WO-00/09443 | * | 2/2000 |

OTHER PUBLICATIONS

Cheung et al., Growth and fabrication with single–walled carbon nanotube probe microscopy tips, *Applied Physics Letters*, vol. 76, No. 21, May 22, 2000, pp. 3136–3138.
Cheung et al., "Carbon nanotube atomic force microscopy tips: Direct growth by chemical vapor deposition and application to high–resolution imaging", *PNAS*, vol. 97, No. 8, Apr. 11, 2000, pp. 3809–3813.
Ren et al., "Synthesis of Large Arrays of Well–Aligned Carbon Nanotubes on Glass", *Science*, vol. 282, Nov. 6, 1998, pp. 110–112.
Stevens et al., "Carbon nanotubes as probes for atomic force microscopy", *Nanotechnology*, vol. 11, Mar. 2000, pp. 1–5.
Huang et al., Growth of highly oriented carbon nanotubes by plasma–enhanced hot filament chemical vapor deposition, *Applied Physics Letter*, vol. 73, No. 26, Dec. 28, 1998, pp. 3845–3847.
Dai et al., Nanotubes as nanoprobes in scanning probe microscopy, *Nature*, vol. 384, Nov. 14, 1996, pp. 147–150.
Kong et al., "Synthesis of individual single–walled carbon nanotubes on patterned silicon wafers" *Nature*, vol. 395, Oct. 29, 1998, pp. 878–881.
EMTECH, Technical Brief: Sputter Coating Incorporating Emitch K500, K550, K575 and K675X, *EMITECH K575*, Mar. 3, 1999, pp. 1–8.
Boisen et al., "AFM probes with directly fabricated tips" *J. Micromech. Microeng.*, vol. 6, 1996, pp. 58–60.
Marco Tortonese, "Cantilevers and Tips for Atomic Force Microscopy" *IEEE Engineering in Medicine and Biology*, Mar/Apr. 1997, pp. 28–33.
Ren et al., "Growth of a single freestanding multiwall carbon nanotube on each nanonickel dot", *Applied Physics Letters*, vol. 75, No. 8, Aug. 23, 1999, pp. 1086–1088.
CRC Handbook of Metal Etchants, 1991, pp. 857–875.

* cited by examiner

Primary Examiner—Hezron Williams
Assistant Examiner—Michael Cygan
(74) Attorney, Agent, or Firm—Michael O. Scheinberg

(57) ABSTRACT

A method of fabricating a carbon nanotube probe tip and the resultant probe tip, particularly for use in an atomic force microscope. A moderately sharply peaked support structure has its tip cut or flattened to have a substantially flat end of size of about 20 to 200 nm across. The support structure may be formed by etching a conical end into a silica optical fiber. Nickel or other catalyzing metal such as iron is directionally sputtered onto the flat end and the sloped sidewalls of the support structure. The nickel is anisotropically etched to remove all the nickel from the sidewalls but leaving at least 15 nm on the flat end to form a small nickel dot. A carbon nanotube is then grown with the nickel catalyzing its growth such that only a single nanotube forms on the nickel dot and its diameter conforms to the size of the nickel dot.

28 Claims, 2 Drawing Sheets

CARBON NANOTUBE PROBE TIP GROWN ON A SMALL PROBE

FIELD OF THE INVENTION

The invention relates generally to mechanical probe tips such as those used in atomic force microscopy. In particular, the invention relates to a carbon nanotube grown directly on a pointed end of a probe.

BACKGROUND ART

Atomic force microscopes (AFMs) have been recently developed for mechanically profiling small features, for example, determining critical dimensions (CDs) of via holes in semiconductor integrated circuits. Such holes have depths of about 1 μm and widths which are being pushed to 180 nm and below. For detailed measurement of the feature an exceedingly fine probe tip is disposed on the end of a cantilever overlying the feature. In the pixel mode of operation, the probe tip is successively positioned at points on a line above and traversing the feature being probed. The cantilever lowers the probe tip until it encounters the surface, and both the horizontal position and the vertical position at which the probe meets the surface are recorded. A series of such measurements provide the desired microscopic profile. An example of such an atomic force microscope is the Stylus Nanoprobe SNP available from Surface/Interface, Inc. of Sunnyvale, Calif. It employs technology similar to the rocking balanced beam probe disclosed by Griffith et al. in U.S. Pat. No. 5,307,693 and by Bryson et al. in U.S. Pat. No. 5,756,887.

Such a tool is schematically illustrated in the side view of FIG. 1. A few more details are found in U.S. patent application Ser. No. 09/354,528, filed Jul. 15, 1999 and incorporated herein by reference in its entirety. A wafer 10 or other sample to be examined is supported on a support surface 12 supported successively on a tilt stage 14, an x-slide 16, and a y-slide 18, all of which are movable along their respective axes so as to provide horizontal two-dimensional and tilt control of the wafer 10. Although these mechanical stages provide a relatively great range of motion, their resolutions are relatively coarse compared to the resolution sought in the probing. The bottom y-slide 18 rests on a heavy granite slab 20 providing vibrational stability. A gantry 22 is supported on the granite slab 20. A probe head 24 hangs in the vertical z-direction from the gantry 22 through an intermediate piezoelectric actuator 26 providing about 10 gm of motion in (x, y, z) by voltages applied across electrodes attached to the walls of a piezoelectric tube. A probe assembly with a tiny attached probe tip 28 projects downwardly from the probe head 24 to selectively engage the probe tip 28 with the top surface of the wafer 10 and to thereby determine its vertical and horizontal dimensions.

Principal parts of the probe head 24 of FIG. 1 are illustrated in the side view of FIG. 2. A dielectric support 30 fixed to the bottom of the piezoelectric actuator 26 includes on its top side, with respect to the view of FIG. 1, a magnet 32. On the bottom of the dielectric support 30 are deposited two isolated capacitor plates 34, 36 and two interconnected contact pads 38.

A beam 40 is medially fixed on its two lateral sides and is also electrically connected to two metallic and ferromagnetic ball bearings 42. The beam 40 is preferably composed of heavily doped silicon so as to be electrically conductive, and a thin silver layer is deposited on it to make good electrical contacts to die ball bearings. The two ball bearings 42 are placed on respective ones of the two contact pads 38 and generally between the capacitor plates 34, 36, and the magnet 32 holds the ferromagnetic bearings 42 and the attached beam 40 to the dielectric support 30. The attached beam 40 is held in a position generally parallel to the dielectric support 40 with a balanced vertical gap 46 of about 25 gm between the capacitor plates 34, 36 and the beam 40. Unbalancing of the vertical gap allows a rocking motion of about 25 gm. The beam 40 holds on its distal end a glass tab 48 to which is fixed a stylus 50 having the probe tip 52 projecting downwardly to selectively engage the top of the wafer 10 being probed.

Two capacitors are formed between the respective capacitor plates 34, 36 and the conductive beam 40. The capacitor plates 34, 36 and the two contact pads 38, commonly electrically connected to the conductive beam 40, are separately connected by three unillustrated electrical lines to three terminals of external measurement and control circuitry This servo system both measures the two capacitances and applies differential voltage to the two capacitor plates 34, 36 to keep them in the balanced position. When the piezoelectric actuator 26 lowers the stylus 50 to the point that it encounters the feature being probed, the beam 40 rocks upon contact of the probe tip 52 with the wafer 10. The difference in capacitance between the plates 34, 36 is detected, and the servo circuit attempts to rebalance the beam 40 by applying different voltages across the two capacitors, which amounts to a net force that the stylus 50 is applying to the wafer 10. When the force exceeds a threshold, the vertical position of the piezoelectric actuator 26 is used as an indication of the depth or height of the feature.

This and other types of AFMs have control and sensing elements more than adequate for the degree of precision for profiling a 1 80 nm×1 μm hole. However, the probe tip presents a challenge for profiling the highly anisotropic holes desired in semiconductor fabrication as well as for other uses such as measuring DNA strands and the like. The probe tip needs to be long, narrow, and stiff. Its length needs to at least equal the depth of the hole being probed, and its width throughout this length needs to be less than the width of the hole. A fairly stiff probe tip reduces the biasing introduced by probe tips being deflected by a sloping surface.

One popular type of probe tip is a shaped silica tip, such as disclosed by Marchman in U.S. Pat. Nos. 5,395,741 and 5,480,049 and by Filas and Marchman in U.S. Pat. No. 5,703,979. A thin silica fiber has its end projecting downwardly into an etching solution. The etching forms a tapered portion near the surface of the fiber, and, with careful timing, the deeper portion of the fiber is etched to a cylinder of a much smaller diameter. The tip manufacturing is relatively straightforward, and the larger fiber away from the tip provides good mechanical support for the small tip. However, it is difficult to obtain the more desirable cylindrical probe tip by the progressive etching method rather than the tapered portion alone. Furthermore, silica is relatively soft so that its lifetime is limited because it is continually being forced against a relatively hard substrate.

One promising technology for AFM probe tips involves carbon nanotubes which can be made to spontaneously grow normal to a surface of an insulator such as glass covered with a thin layer of a catalyzing metal such as nickel. Carbon nanotubes can be grown to diameters ranging down to 5 to 20 nm and with lengths of significantly more than 1 μm. Nanotubes can form as single-wall nanotubes or as multiple-wall nanotubes. A single wall is an cylindrically shaped atomically thin sheet of carbon atoms arranged in an hexagonal crystalline structure with a graphitic type of bonding. Multiple walls bond to each other with a tetrahedral bonding structure, which is exceedingly robust, The modulus of elasticity for carbon nanotubes is significantly greater than that for silica. Thus, nanotubes offer a very stiff and very narrow probe tip well suited for atomic force microscopy. Furthermore, carbon nanotubes are electrically conductive so that they are well suited for scanning tunneling microscopy and other forms of probing relying upon passing a current through the probe tip. Dai et al. describe the manual fabrication of a nanotube probe tip in "Nanotubes as nanoprobes in scanning probe microscopy," *Nature*, vol. 384, Nov. 14, 1996, pp. 147–150.

Typically, nanotubes suffer from the disadvantage that a large number of them simultaneously form on a surface producing either a tangle or a forest of such tubes, as is clearly illustrated by Ren et al. in "Synthesis of large arrays of well-aligned carbon nanotubes on glass," *Science*, vol. 282, Nov. 6, 1998, pp. 1105–1107. The task then remains to affix one nanotube to a somewhat small probe tip support. Dai et al. disclose an assembly method in which they coat the apex of a silicon pyramid at the probe end wit adhesive. The coated silicon tip was then brushed against a bundle of nanotubes, and a single nanotube can be pulled from the bundle. This method is nonetheless considered expensive and tedious requiring both optical and electron microscopes. Additionally, there is little control over the final orientation of the nanotube, certainly not to the precision needed to analyze semiconductor features. Cheung et al. describe another method of growing and transferring nanotubes in "Growth and fabrication with single-walled carbon nanotube probe microscopy tips," *Applied Physics Letters*, vol. 76, no. 21, May 22, 2000, pp. 3136–3138. However, they either produce poor directional control with a very narrow, single nanotube or require a complex transfer mechanism with nanotube bundles.

Ren et al. describe a method of growing isolated nanotubes in "Growth of a single freestanding multiwall carbon nanotube on each nanonickel dot," *Applied Physics Letters*, vol. 75, no. 8, Aug. 23, 1999, pp. 1086–1088. They deposit 15 nm of nickel on silicon and pattern it into a grid of nickel dots having sizes of somewhat more than 100 nm. Plasma-enhanced chemical vapor deposition using acetylene and ammonia produces a single nanotube on each dot having an obelisk shape with a base diameter of about 150 nm and a sharpened tip. However, Ren et al. do not address the difficult problem of transferring such a nanotube, which they describe as being tightly bonded to the nickel, from the nickel-plated substrate to a probe end.

Cheung et al. disclose another method of growing isolated nanotubes in "Carbon nanotube atomic force microscopy tips: Direct growth by chemical vapor deposition and application to high-resolution imaging," *Proceedings of the National Academy of Sciences*, vol. 97, no. 8, Apr. 11, 2000, pp. 3809–3813. They etch aniostropic holes in a silicon tip and deposit the catalyzing iron or iron oxide in the bottom of the holes. The carbon nanotubes grow out of the holes. However, growth in such restricted geometries is considered to be disadvantageous and to favor single-wall rather than multiple-wall nanotubes. Further, this method provides only limited control over the number and size of the nanotubes being grown.

Accordingly, a more efficient method is desired for forming a probe tip having a single carbon nanotube. Furthermore, the structure of the probe end and probe tip should facilitate assembly of the probe and contribute to its robustness.

SUMMARY OF THE INVENTION

A probe end is shaped to have sloping sides and a generally flat end, that is, in the shape of sloping mesa. The diameter of the mesa top is preferably in the range of 20 to 300 nm. Nickel or other material that catalyzes the growth of carbon nanotubes is directionally deposited onto the probe end. Because of the geometry, the thickness of the deposited nickel, as measured from the underlying surface, is greater on the mesa top than on the mesa sides. The nickel is then isotropically etched for a time sufficient to remove the nickel from the mesa sides but to leave sufficient nickel on the mesa top to catalyze the growth of a single carbon nanotube. Typically, the nanotube grows with a bottom diameter approximately equal to that of the nickel dot on top of the mesa.

DETAILED DESCRIPTION OF THE PREFERRED EMBODIMENTS

The invention allows the fabrication of a single carbon nanotube on a narrow support structure well suited for easy attachment to a probe of an atomic force microscope (AFM) or other type of microprobe.

Figure 1:
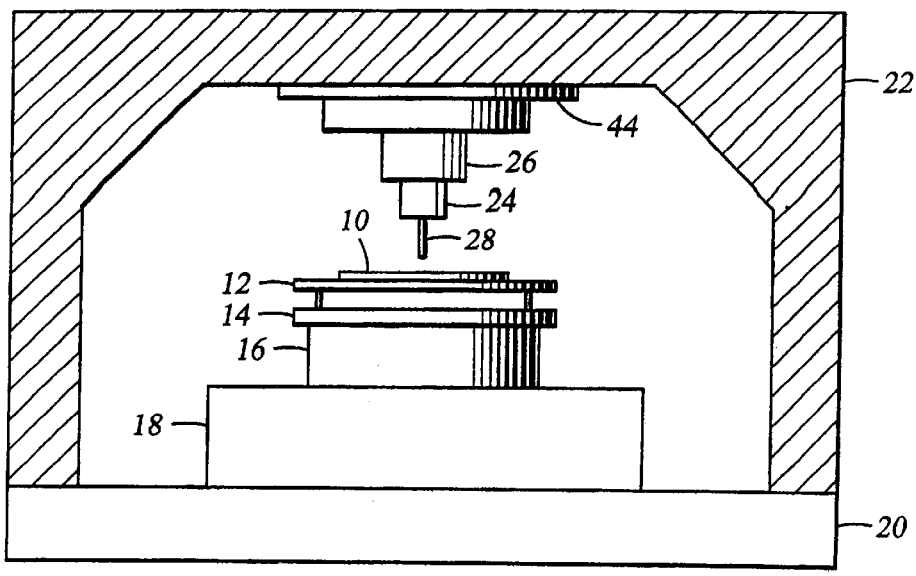
FIG. 1 is a schematic elevational view of a prior art rocking beam atomic force microscope.
Figure 2:
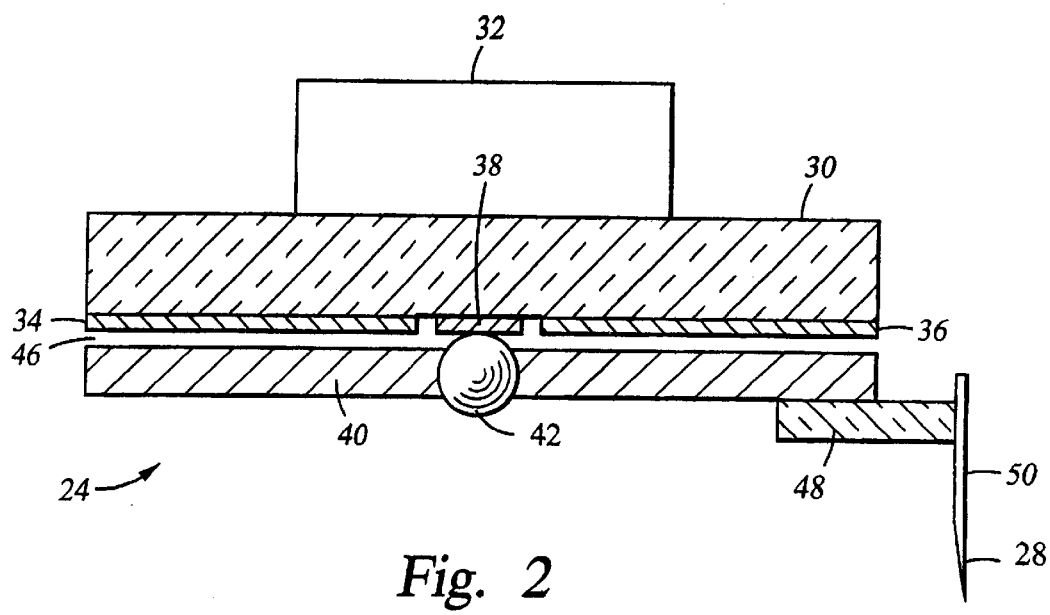
FIG. 2 is a cross-sectional side view of a portion of the prior art atomic force microscope of FIG. 1.
Figure 3:
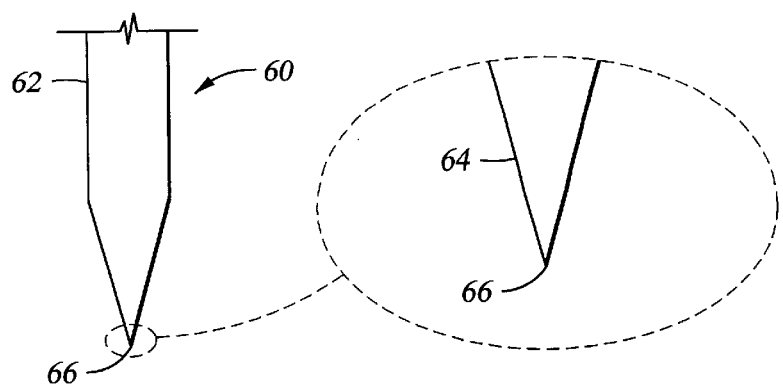
FIG. 3 is a cross-sectional side view of a probe end having a tapered tip and available in the prior art, the figure including an exploded view of the sharp probe end.

A support structure 60, illustrated in side view in FIG. 3, is formed having a relatively massive upper portion 62 and a shaped tip 64 with a sharp point 66 having a curvature of less than about 50 nm. On the scale of probe tips, the upper portion 62 and the shaped tip 64 have a common longitudinal axis. The support structure 60 is illustrated with the orientation of its intended final use in a microscope overlying a sample being probed. The support structure 60 may be the quartz (silica) fiber of Marchman in which the shaped tip 64 is formed by placing an end of a 125 $\mu$m fiber in a bath of hydrofluoric acid (HF) overlaid by a layer of oil and leaving it in that position for a sufficiently long period that the fiber end is etched to a point. That is, the etching continues to completely etch away the cylinder of the Marchman tip. The point at which the HF completely dissolves the fiber defines the sharp point 66. Alternatively, the shaped tip can be defined by polishing and grinding, particularly for sapphire fiber. The shaped tip 64 need not have a strictly conical shape, but it is advantageous that there be an sloping portion between the sharp point 66 and the relatively massive fiber 62 to provide mechanical stability in the finally assembled probe.

Figure 4:
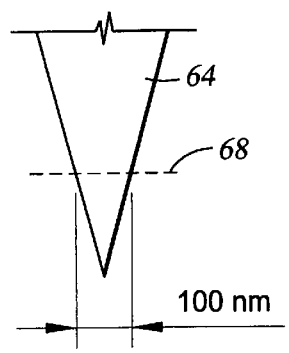
FIG. 4 is a cross-sectional view showing the position of a sectioning of the probe end of FIG. 2.

The support structure 60 is then subjected to focused ion beam (FIB) milling along a line 68, illustrated in the cross-sectional view of FIG. 4, that in this embodiment is transverse to the axis of the support structure and passes through a predetermined width of the shaped tip 64. The predetermined width closely corresponds to the width of the final carbon nanotube and may be, for example, 100 nm. FIB milling is a well known technique for micromicromaching and relies upon a focused beam typically of gallium ions to mill structures with a resolution down to about 5 nm. Such a system is the FIB 200TEM available from FEI Company of Hillsboro, Oreg. Other milling techniques could be used, but FIB milling is effective and economical.

Figure 5:
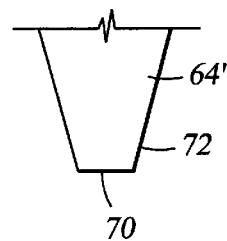
FIG. 5 is a cross-sectional view showing the sectioned probe end.
Figure 6:
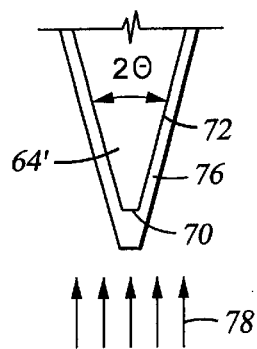
FIG. 6 is a cross-sectional view showing the directional deposition of nickel or other catalyzing material.

The milling produces a shaped tip 64', illustrated in the cross-sectional view of FIG. 5, having a flat end 70 and sloping sidewalls 72. Then, as illustrated in the cross-sectional view of FIG. 6, a film 76 of nickel or other catalyzing metal is then directionally deposited onto the probe tip 64', preferably by sputtering metal atoms along the longitudinal axis of the shaped tip 64'. The thickness of the deposition, as measured along the longitudinal axis, is substantially constant between the area of the flat end 70 and the sloping sidewalls 72 of the shaped tip 64'. However, the thickness, as measured at a perpendicular to the underlying surface, is substantially thicker in the area overlying the flat 70 than in the areas overlying the sloping sidewalls 72. The effect is primarily geometric. If the probe tip has a tip angle $2\theta$ and the deposition is totally aniostropic, then the sidewall thickness is $\sin\theta$ times the end thickness. For example, if $2\theta=31.3°$, then the sidewall thickness is 27% of the end thickness. The sputtering may be performed in an ion sputtering system using a nickel target. Such a system is the Model 681 High Resolution Ion Coater from Gatan of Pleasanton, Calif. Other types of deposition are possible, such as molecular beam techniques usually associated with molecular beam epitaxy.

Figure 7:
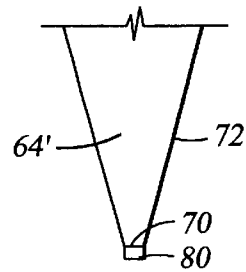
FIG. 7 is a cross-sectional view showing a nickel dot formed only on the sectioned end of the probe end.

As illustrated in the cross-sectional view of FIG. 7, the nickel-plated shaped tip 64' is subjected to isotropic etching of the nickel for a time just sufficient to remove the nickel from the tip sidewalls 72 but leaving a nickel dot 80 over the tip end 70. A minimum thickness of approximately 15 to 20, preferably 30 to 40 nm, of nickel is desired in the area of the nickel dot 80 to catalyze the nanotube growth. Assuming the lower value of 15 nm and a tip angle $2\theta$ of 31.3°, about 27 nm of nickel needs to be anisotropically deposited over the area of the tip end 70 to account for the end nickel being thinned during removal of the sidewall nickel, which has an initial thickness of 7 nm. The etching time obviously needs to be controlled so that it continues long enough to remove the sidewall nickel while leaving sufficient of the end nickel.

It may be advantageous to oxidize the nickel prior to etching, and in any case nickel will typically have an oxidized surface layer upon any exposure to air. Any number of isotropic wet etchants for nickel and nickel oxide are known, as tabulated in *CRC Handbook of Metal Etchants*, eds. Walker et al., CRC Press, 1991, pp. 857–875 and include dilute nitric and sulfuric acids for nickel and ammonium hydroxide for nickel oxide.

Figure 8:
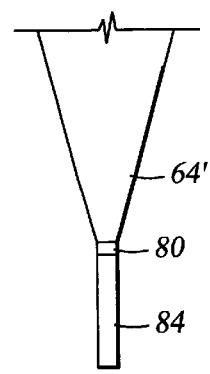
FIG. 8 is a cross-sectional view showing a nanotube grown on the nickel dot.

The nickel dot 80 provides a small catalyzing area for the growth of a single carbon nanotube 84 illustrated in cross-sectional view in FIG. 8. Ren et al. and Cheung et al. describe the process for selective growth of nanotubes in the above cited references. The diameter of the nanotube 34 corresponds generally to the diameter or average lateral extent of the flattened end 70 of the shaped tip 64'. For a non-circular end 80, the nanotube diameter is approximately equal to the minimum lateral extent of the end.

It has proven difficult to control the length to which nanotubes grow. Accordingly, it may be necessary to perform an additional step of cutting the carbon nanotube to a prescribed length, for example, by FIB milling.

The probe structure illustrated in FIG. 8 includes a relatively rugged support structure 62, illustrated in FIG. 3, which is ready to be mounted onto the probe of the AFM or other microscope using a stylus.

The method described above requires that the sidewalls of the shaped tip slope away from the tip end. To achieve the required differential but isotropic etching, the slope is preferably at least 60° from the plane. The differential coating works even with a slope of 90°, that is, vertical sidewalls. Such a shape may be produced by FIB milling, for example, a cylinder having a diameter of 100 nm or a similarly sized rectangular post into the tip 66 at the end of the conical tip 64 prior to nickel deposition.

Figure 9:
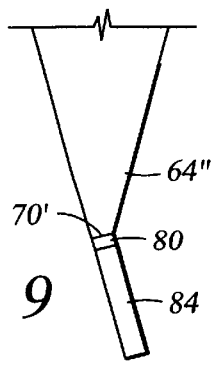
FIG. 9 is a cross-sectional view showing a second embodiment of the invention.

The embodiment described above produces a carbon nanotube extending along the axis of the conical tip. However, in another embodiment illustrated in the cross-sectional view of FIG. 9, a shaped tip 64" is formed by milling the conical tip 64 to have an inclined flat end 70'. That is, the flat end 70' is not perpendicular to the axis of the fiber or the shaped tip 64". The deposition of the nickel 80 and the growth of the carbon nanotube 84 are then performed as described above. This configuration is particularly useful for probing very narrow features at the bottom edges of somewhat wider holes, for example, punch through occurring at the corner of a narrow trench, which occurs in semiconductor processing.

Although the above description includes a support structure formed from a quartz fiber, it is known that the preferential etching of <111> planes of <001>-oriented silicon can form pyramids having an apex angle of $2\theta=70.5°$, which is equivalent to a slope of 54.74° from the plane. Often a thin layer of silicon nitride is coated on the silicon pyramid. After cutting, a square end surface is formed. The underlying silicon is very easily mounted to the AFM probe. Cheung et al. describe a method of cutting a flat surface at the pyramid apex by dragging the pyramid across a hard surface. Such a surface may not be completely flat but most probably deviates by less than 10° from a planar surface. The support structure may be composed of other materials.

Nickel is not the only possible material for catalyzing nanotube growth. Iron and iron oxide have been used. Cobalt has been suggested as a catalyst. All these catalyzing materials can be used with the process described above.

None of the steps described above are particularly difficult or problematic. FIB milling has been shown to be easily and reliably performed. Thereby, probe tips produced according to the invention are relatively economical. Further, the sputter coating and isotropic etching can be simultaneously performed upon a large number of probe tips mounted on a common tip holder, thereby further improving the efficiency of the fabrication method of the invention.

The carbon nanotubes produced according to the invention are grown on substantially planar and well defined areas of nickel or other catalyzing material. Thereby, the tip diameter and orientation are well controlled. Carbon nanotube tips have the well known characteristics of high stiffness and toughness to wear under continued use.

What is claimed is:

1. A method of forming a probe tip, comprising the steps of:

providing a member comprising a shaped tip having sidewalls and extending along an axis;

cutting a flat surface in said shaped tip;

anisotropically depositing a catalytic material onto said flat surface and onto said sloping sidewalls;

etching said catalytic material to remove said catalytic material from said sidewalls while leaving a thickness of said catalytic material on said flat surface; and growing a carbon nanotube on a portion of said catalytic material remaining on said flat surface in a process catalyzed by said catalytic material.

2. The method of claim 1, wherein said flat surface has a minimum lateral size of between 15 and 300 nm.

3. The method of claim 1, wherein said catalytic material comprises nickel.

4. The method of claim 1, wherein said catalytic material comprises iron.

5. The method of claim 1, wherein said member comprises silicon oxide.

6. The method of claim 1, wherein said member is formed from silica fiber.

7. The method of claim 6, wherein said member has said ends formed into said fiber and said sidewalls slope from an axis of said fiber.

8. The method of claim 6, wherein said planar end is cut to be non-perpendicular to an axis of said fiber.

9. The method of claim 1, wherein said cutting step cuts said sidewalls into said member to be parallel to each other.

10. The method of claim 1, wherein said member comprises silicon.

11. The method of claim 1, wherein said shaped tip has a pyramidal shape.

12. The method of claim 1, wherein said anisotropic coating step comprises sputtering.

13. The method of claim 1, wherein said cutting step comprises focused ion beam milling.

14. The method of claim 1, further comprising cutting said carbon nanotube to reduce its length.

15. The method of claim 14, wherein said cutting said carbon nanotube comprises focused ion beam milling.

16. The method of claim 1, wherein said etching said catalytic material comprises isotropically etching said catalytic material.

17. The method of claim 1 wherein cutting a flat surface in said shaped tip includes cutting a flat surface having a normal that is tilted with respect to the axis, thereby producing a nanotube that is tilted with respect to the axis.

18. The method of claim 1 wherein growing a carbon nanotube on a portion of said catalytic material remaining on said flat surface includes growing a carbon nanotube having a diameter substantially equal to the width of said flat area.

19. A probe tip formed by the method of claim 1.

20. A probe tip, comprising:

a support including a shaped tip having a planar end and sidewalls sloping from said planar end;

said support having a longitudinal axis running from the shaped tip through the center of the support and wherein the surface of the planar end is not perpendicular to the longitudinal axis;

a catalyzing layer of material capable of catalyzing growth of carbon nanotubes covering substantially all of the surface of said planar end but not on said sidewalls; and a single carbon nanotube formed on said catalyzing layer.

21. A method of forming a probe tip, comprising the steps of:

providing a probe tip support member having at one end a substantially planar surface by cutting a tapering probe tip support member at a position to provide a substantially planar surface of a particular size;

depositing a catalyst on the planar surface, the catalyst catalyzing the growth of the nanotube; and growing a nanotube on the substantially planar surface in a process catalyzed by said catalytic material, said nanotube having a diameter substantially the same as the size of the planar surface.

22. The method of claim 21 in which depositing a catalyst on the substantially planar surface includes depositing nickel, iron, or an oxide of nickel or iron.

23. A probe tip formed by the method of claim 21.

24. The method of claim 21 in which the probe tip support has a longitudinal axis running from the planar surface of said support through the center of said support and in which cutting the tapering probe tip support member at a position to provide a planar surface of a desired size includes cutting the probe tip support member to provide a planar surface that is not perpendicular to the longitudinal axis, thereby producing a nanotube that is not parallel to the longitudinal axis.

25. A probe tip, comprising:

a probe tip support including a surface at one end;

a catalyzing material capable of catalyzing growth of carbon nanotubes covering substantially all of said surface; and a nanotube formed on said catalyzing material and extending from the catalyzing material on said surface.

26. The probe tip of claim 25, wherein said nanotube is a multi-wall nanotube.

27. The probe tip of claim 25, wherein said catalyzing material comprises metallic nickel, nickel oxide, metallic iron, or iron oxide.

28. A probe tip, comprising:

a probe tip support including a surface at one end, wherein said probe tip support tapers toward the surface at one end and the surface having a diameter;

a catalyzing material capable of catalyzing growth of carbon nanotubes on said surface; and a nanotube formed on said catalyzing material and extending from the surface wherein the carbon nanotube has a diameter equal to that of the surface.

* * * * *